United States Patent [19]

Breeden et al.

[11] 4,201,052
[45] May 6, 1980

[54] POWER TRANSMISSION

[75] Inventors: Robert H. Breeden, Metamora; Robert G. Farrell, Ortonville; Henry D. Taylor, Pontiac, all of Mich.

[73] Assignee: Sperry Rand Corporation, Troy, Mich.

[21] Appl. No.: 24,058

[22] Filed: Mar. 26, 1979

[51] Int. Cl.² .................... F16H 39/46; F15B 11/16
[52] U.S. Cl. .......................... 60/445; 60/461; 60/484; 91/454; 91/461
[58] Field of Search ............ 60/444, 445, 452, 460, 60/461, 468, 470, 484, DIG. 10; 91/415, 420, 444, 461, 462, 464, 529, 530, 454, 455

[56] References Cited
U.S. PATENT DOCUMENTS

| | | | |
|---|---|---|---|
| 2,816,420 | 12/1957 | Walsh | 91/455 |
| 3,151,455 | 10/1964 | Tennis | 91/454 |
| 3,991,571 | 11/1976 | Johnson | 60/452 |

Primary Examiner—Edgar W. Geoghegan
Attorney, Agent, or Firm—Barnes, Kisselle, Raisch & Choate

[57] ABSTRACT

A hydraulic control system comprising a hydraulic actuator having opposed openings adapted to alternately function as inlets and outlets for moving the element of the actuator in opposite directions and a variable displacement pump with loading sensing control for supplying fluid to said actuator. A meter-in valve is provided to which the fluid from the pump is supplied and a pilot controller alternately supplies fluid at pilot pressure to the meter-in valve for controlling the direction and displacement of movement of the meter-in valve and the direction and velocity of the actuator. A pair of lines extends from the meter-in valve to the respective openings of the actuator and a meter-out valve is associated with each line of the actuator for controlling the flow out of the actuator when that line to the actuator does not have pressure fluid from the pump applied thereto. Each meter-out valve is pilot operated by the pilot pressure from the controller.

40 Claims, 18 Drawing Figures

DRIVING LOAD

LOWERING LOAD

FLOAT

PORT RELIEF VALVE ACTION

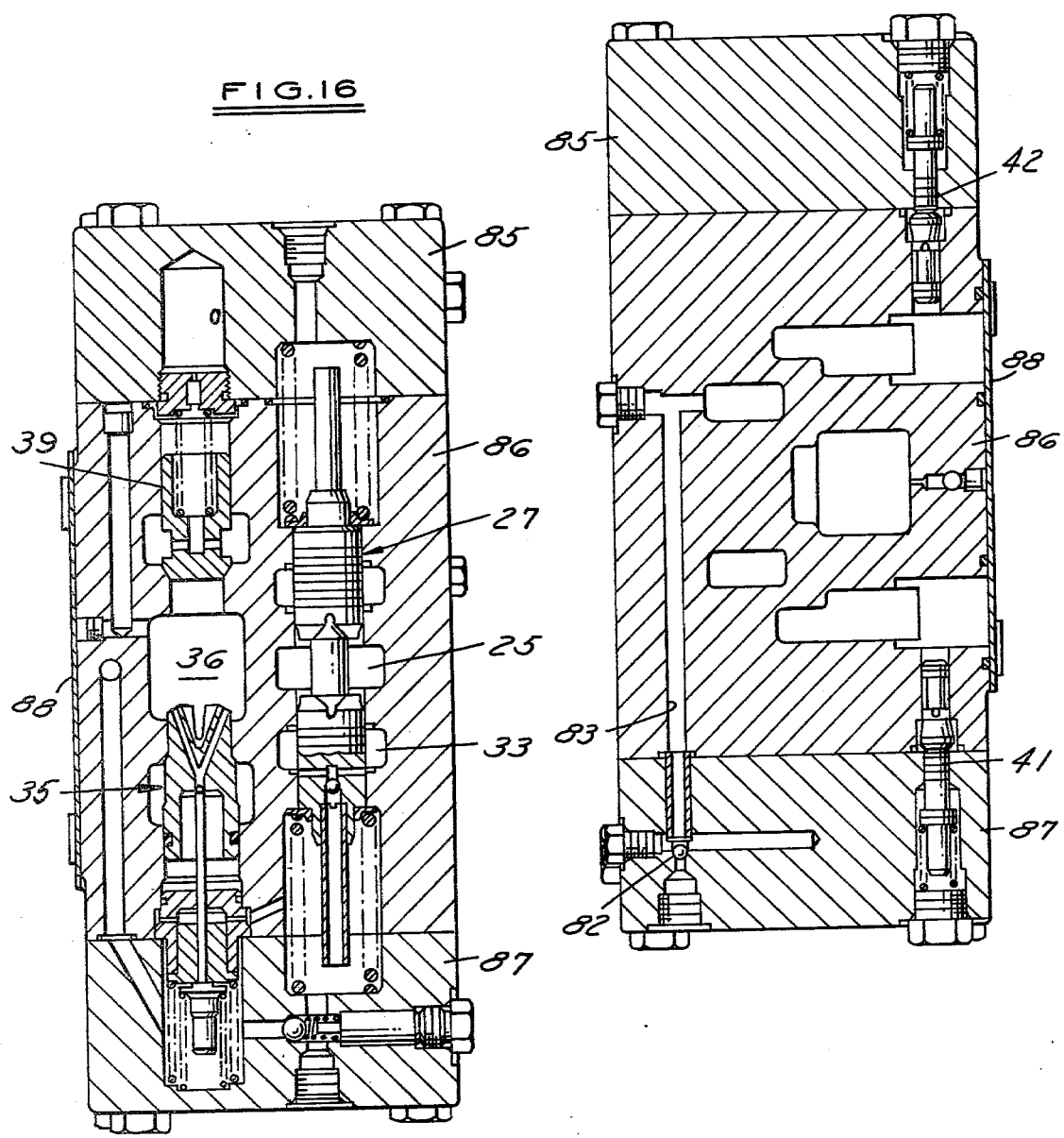

POWER TRANSMISSION

This invention relates to power transmissions and particularly to hydraulic circuits for actuators such as are found in earth moving equipment including excavators and cranes.

BACKGROUND AND SUMMARY OF THE INVENTION

This invention relates to hydraulic systems for controlling a plurality of actuators such as hydraulic cylinders which are found, for example, in earth moving equipment such as excavators and cranes. In such a system, it is conventional to provide a pilot operated control valve for each actuator which is controlled by a manually operated controller through a pilot hydraulic circuit. The control valve functions to supply hydraulic fluid to the actuator to control the speed and direction of operation of the actuator. In addition, the control valve for each actuator controls the flow of hydraulic fluid out of the actuator. It is also common to provide counterbalance valves or fixed restrictions to control overrunning loads.

Among the objectives of the present invention are to provide a hydraulic system for accurately controlling the position and speed of operation of the actuators; which system is simple and easy to make and maintain; which system is unaffected by change of load pressure of various portions of the system or other actuators served by the same source; which system may not use flow from the pressure source in the case of overrunning loads on the actuators; wherein the control valves may be mounted adjacent the actuator for preventing loss of control of the load in case of malfunction in the hydraulic lines to the actuator; wherein the valves which control flow out of the actuator function to control the velocity in the case of energy generating loads; wherein the valve that controls flow into the actuator controls the velocity in the case of energy absorbing loads; wherein the valve system for each actuator can be mounted on its respective actuator and incorporates means for preventing uncontrolled lowering of the load in case of pressure failure due to breaking of the lines to the valve system; wherein the timing of operation of the valve controlling flow into the actuator and out of the actuator can be designed to accommodate the specific nature of the particular load.

DESCRIPTION OF THE DRAWINGS

FIG. 16 is a sectional view taken along the line 16—16 in FIG. 12.

FIG. 17 is a sectional view taken along the line 17—17 in FIG. 14.

DESCRIPTION

Figure 1:
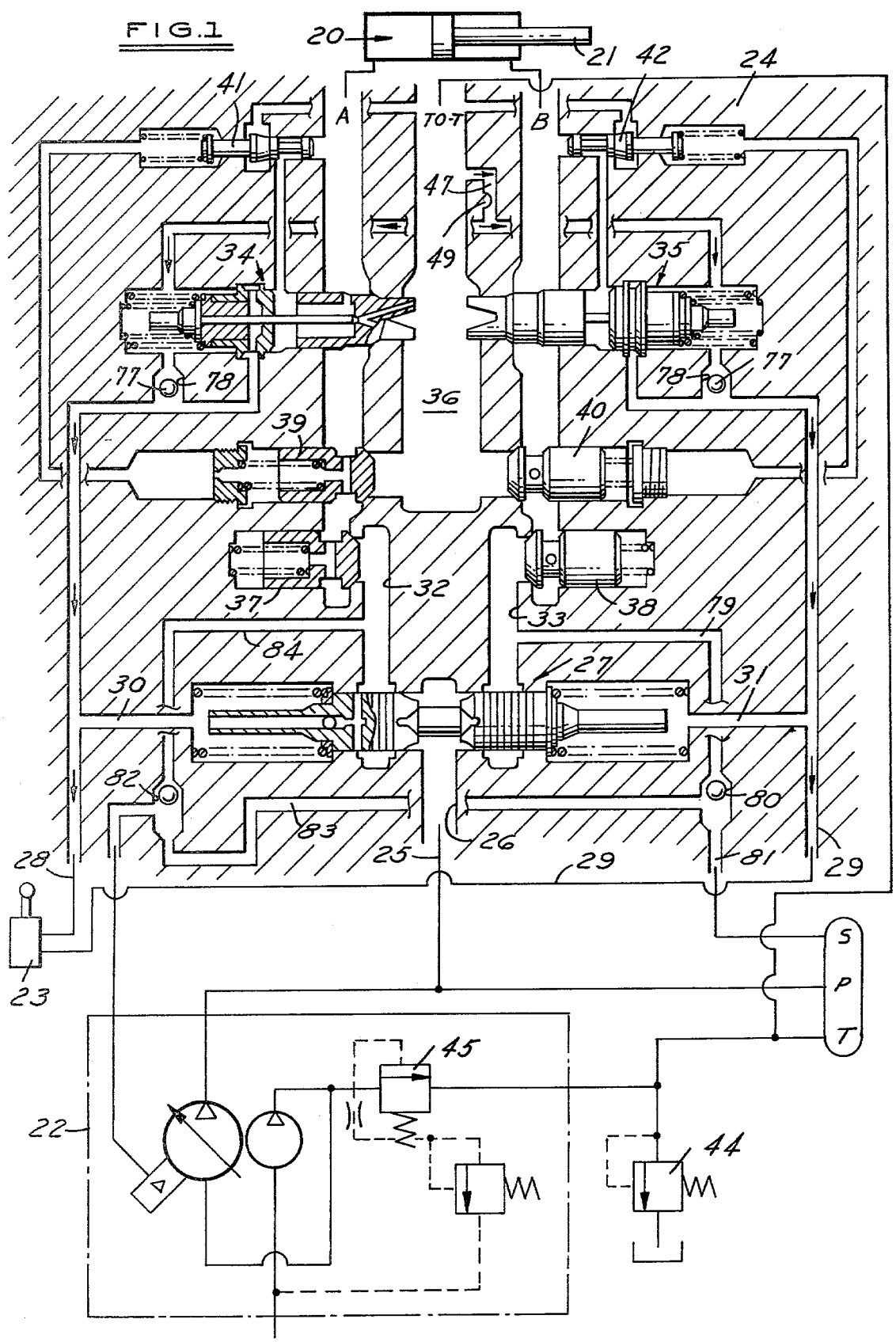
FIG. 1 is a diagrammatic view of a hydraulic system embodying the invention.

Referring to FIG. 1, the hydraulic system embodying the invention comprises an actuator 20, herein shown as a hydraulic cylinder, having a rod 21 that is moved in opposite directions by hydraulic fluid supplied from a variable displacement pump system 22 which has load sensing control in accordance with conventional construction. The hydraulic system further includes a manually operated controller 23 that directs a pilot pressure to a valve system 24 for controlling the direction of movement of the actuator, as presently described. Fluid from the pump 22 is directed to the line 25 and passages 26 to a meter-in valve 27 that functions to direct and control the flow of hydraulic fluid to one or the other end of the actuator 20. The meter-in valve 27 is pilot pressure controlled by controller 23 through lines 28,29 and passages 30,31 to the opposed ends thereof, as presently described. Depending upon the direction of movement of the valve, hydraulic fluid passes through passages 32,33 to one or the other end of the actuator 20.

The hydraulic system further includes a meter-out valve 34,35 associated with each end of the actuator in passages 32,33 for controlling the flow of fluid from the end of the actuator to which hydraulic fluid is not flowing from the pump to a tank passage 36, as presently described.

The hydraulic system further includes spring loaded poppet valves 37,38 in the lines 32,33 and spring loaded anti-cavitation valves 39,40 which are adapted to open the lines 32,33 to the tank passage 36. In addition, spring loaded poppet valves 41,42 are associated with each meter-out valve 34,35 as presently described. A bleed line 47 having an orifice 49 extends from passage 36 to meter-out valves 34,35 and to the pilot control lines 28,29 through check valves 77.

The system also includes a back pressure valve 44 associated with the return or tank line. Back pressure valve 44 functions to minimize cavitation when an overrunning or a lowering load tends to drive the actuator down. A charge pump relief valve 45 is provided to take excess flow above the inlet requirements of the pump 22 and apply it to the back pressure valve 44 to augment the fluid available to the actuator.

Figure 2:
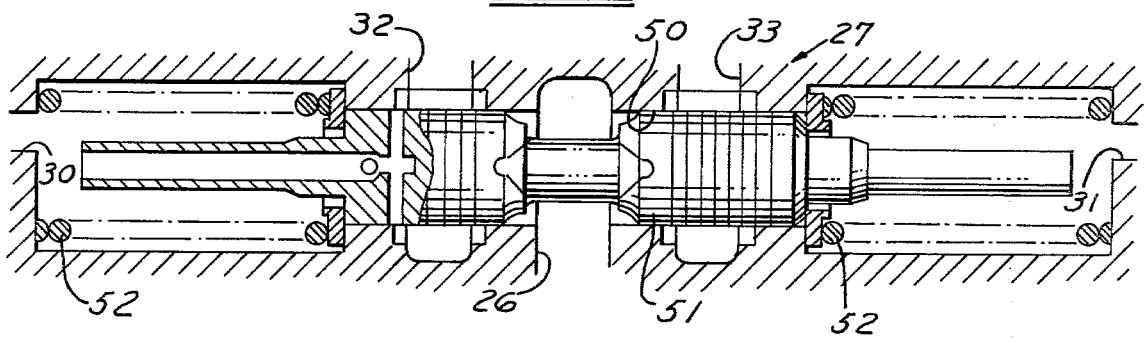
FIG. 2 is a diagrammatic view of a meter-in valve utilized in the system.

Referring to FIG. 2, the meter-in valve 27 comprises a bore 50 in which a spool 51 is positioned and in the absence of pilot pressure maintained in a neutral position by springs 52. The spool 51 normally blocks the flow from the pressure passage 26 to the passages 32,33. When pilot pressure is applied to either passage 30 or 31, the meter-in spool 51 is moved in the direction of the pressure until a force balance exists among the pilot pressure, the spring load and the flow forces. The direction of movement determines which of the passages 32,33 is provided with fluid under pressure from passage 26.

Figure 3:
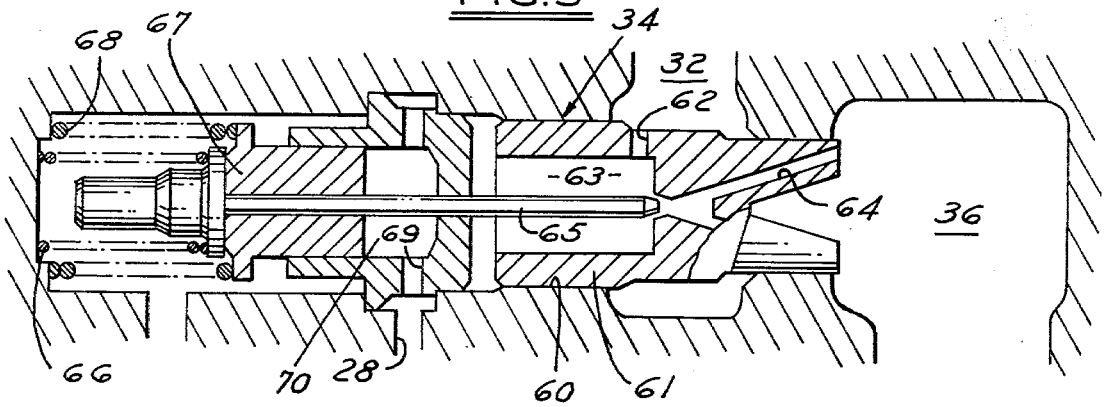
FIG. 3 is a diagrammatic view of a meter-out valve.

Referring to FIG. 3, each meter-out valve 34,35 is of identical construction and, for purposes of clarity, only valve 34 is described. The meter-out valve 34 includes a bore 60 in which a poppet 61 is positioned. The poppet 61 includes a passage 62 extending to a chamber 63 within the poppet and one or more passages 64 to the tank passage 36. A stem 65 normally closes the connection between the chamber 63 and passages 64 under the action of a spring 66. The pressure in chamber 63 equalizes with the pressure in line 32 and the resulting force unbalance keeps poppet 61 seated. The valve further includes a piston 67 surrounding the stem 65 yieldingly urged by a spring 68 to the right as viewed in FIG. 3. The pilot line 28 from the controller 23 extends through a passage 69 to a chamber 70 that acts against the piston 67. When pilot pressure is applied to passage 28, the piston 67 is moved to the left as viewed in FIG. 3 moving the stem 65 to the left permitting chamber 63 to be vented to tank passage 36 via passage 64. The resulting force unbalance causes poppet 61 to move to the left connecting line 32 to passage 36.

It can thus be seen that the same pilot pressure which functions to determine the direction of opening of the meter-in valve also functions to determine and control the opening of the appropriate meter-out valve so that the fluid in the actuator can return to the tank line.

Figure 4:
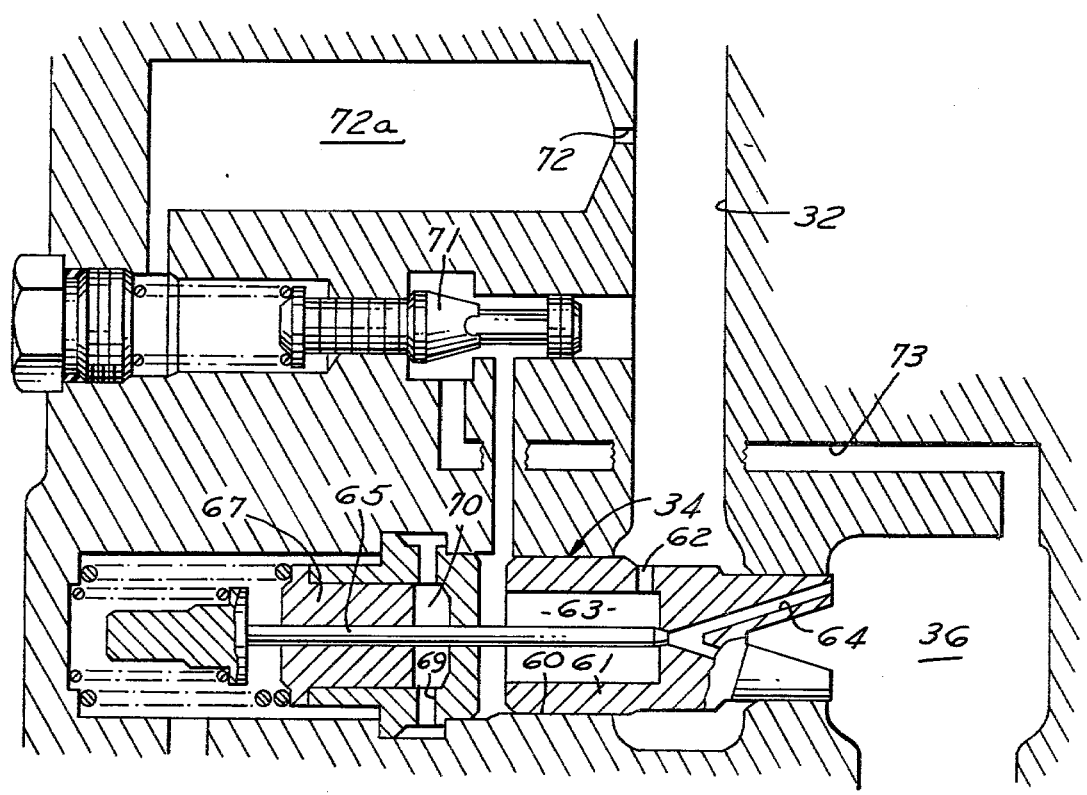
FIG. 4 is a diagrammatic view of a port relief valve and meter-out valve.

Referring to FIG. 4, each of the meter-out valves has associated therewith a spring loaded pilot spool 71 which functions when the load pressure in passage 32 exceeds a predetermined value to open a flow path from the load through a control orifice 62 to the tank passage 36 through an intermediate passage 73. This bleed flow reduces the pressure and closing force on the left end of the poppet valve 61 permitting the valve 61 to move to the left and allowing flow from passage 32 to the return or tank line 36. In order to prevent overshoot when the pressure rises rapidly, an orifice 72 and associated chamber 72a are provided so that there is a delay in the pressure build-up to the left of poppet valve 71. As a result, poppet valves 71 and 61 will open sooner and thereby control the rate of pressure rise and minimize overshoot.

Figure 8:
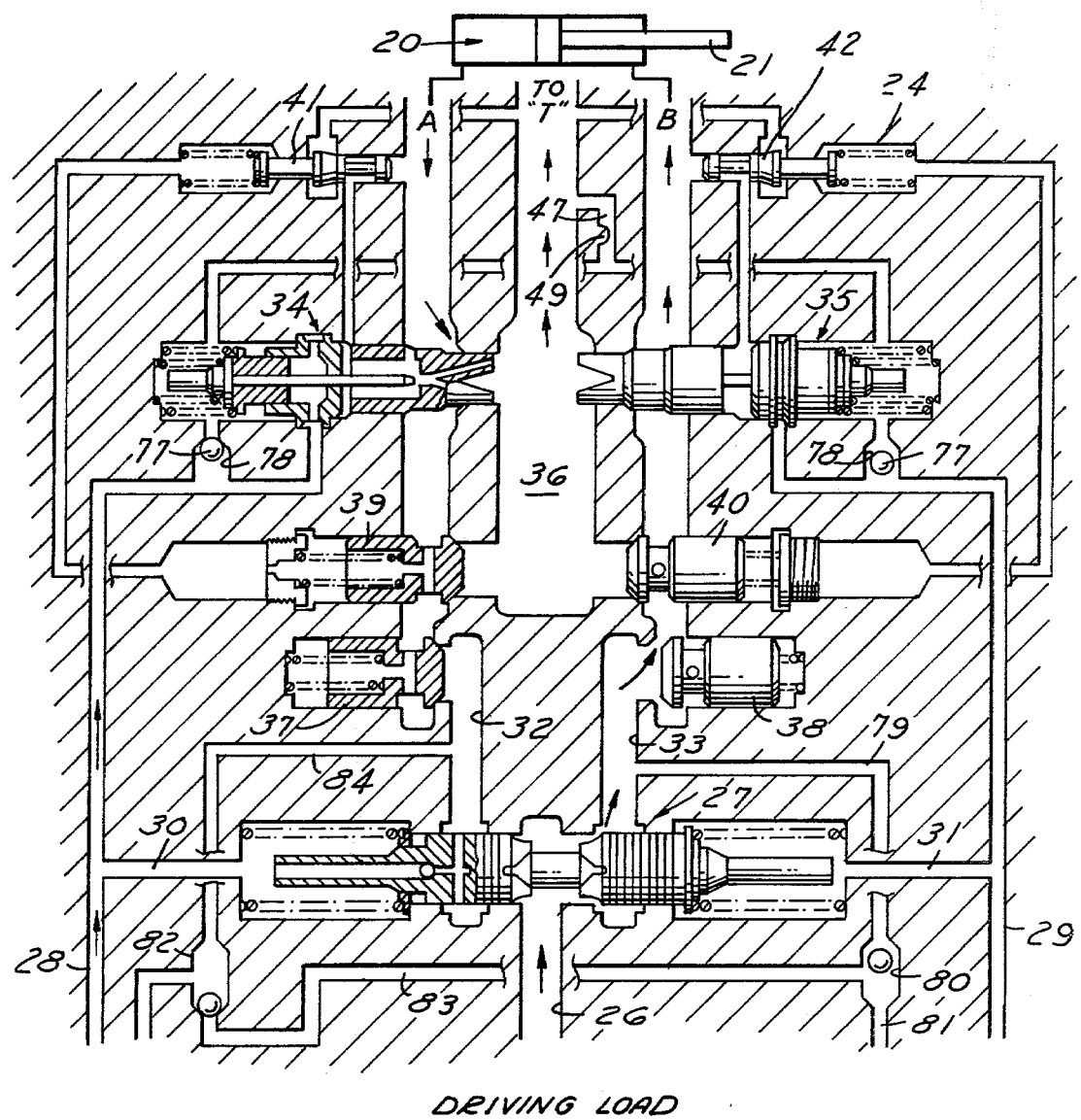
FIGS. 8-11 are diagrammatic views showing the different modes of operation of the system.

The manner in which the system may operate under varying conditions can be readily understood by reference to FIGS. 8–11. Referring to FIG. 8, in the case of an energy absorbing load, when the controller 23 is moved to operate the actuator 20 in a predetermined direction, pilot pressure applied through line 28 and passage 30 moves the spool of the meter-in valve to the right causing hydraulic fluid under pressure to flow through passage 33 opening poppet valve 38 and continuing to the inlet B of actuator 20. The same pilot pressure is applied to the meter-out valve 34 permitting the flow of fluid out of the end A of the actuator 20 to the return or tank passage 36.

Figure 9:
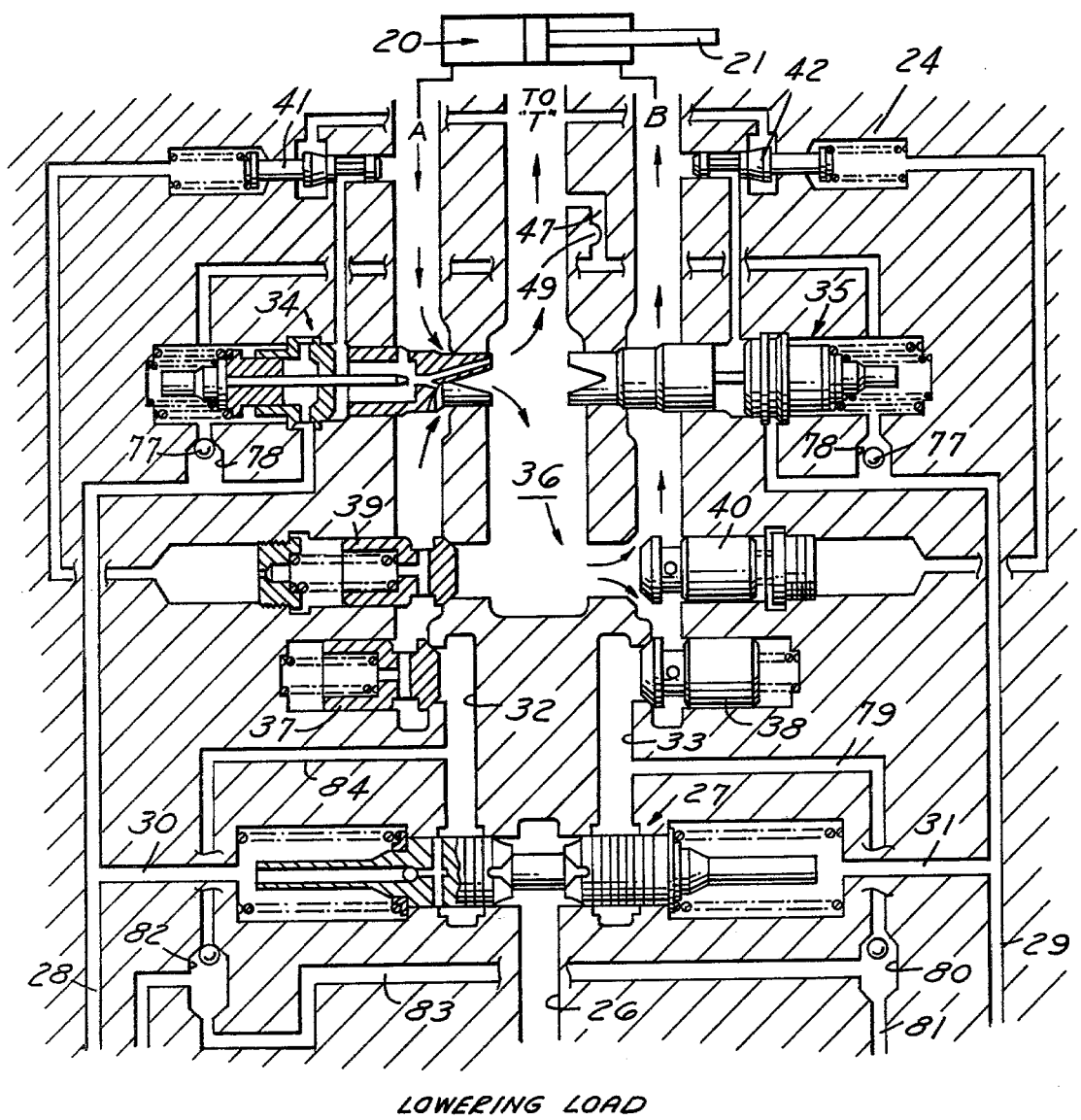

Referring to FIGS. 1 and 9, when the controller 23 is moved to operate the actuator, for example, for an overrunning or lowering a load, the controller 23 is moved so that pilot pressure is applied to the line 28. The meter-out valve 34 opens before the meter-in valve 27 under the influence of pilot pressure. The load on the actuator forces hydraulic fluid through the opening A of the actuator past the meter-out valve 34 to the return or tank passage 36. At the same time, the poppet valve 40 is opened permitting return of some of the fluid to the other end of the actuator through opening B thereby avoiding cavitation. Thus, the fluid is supplied to the other end of the actuator without opening the meter-in valve 27 and without utilizing fluid from the pump.

Figure 10:
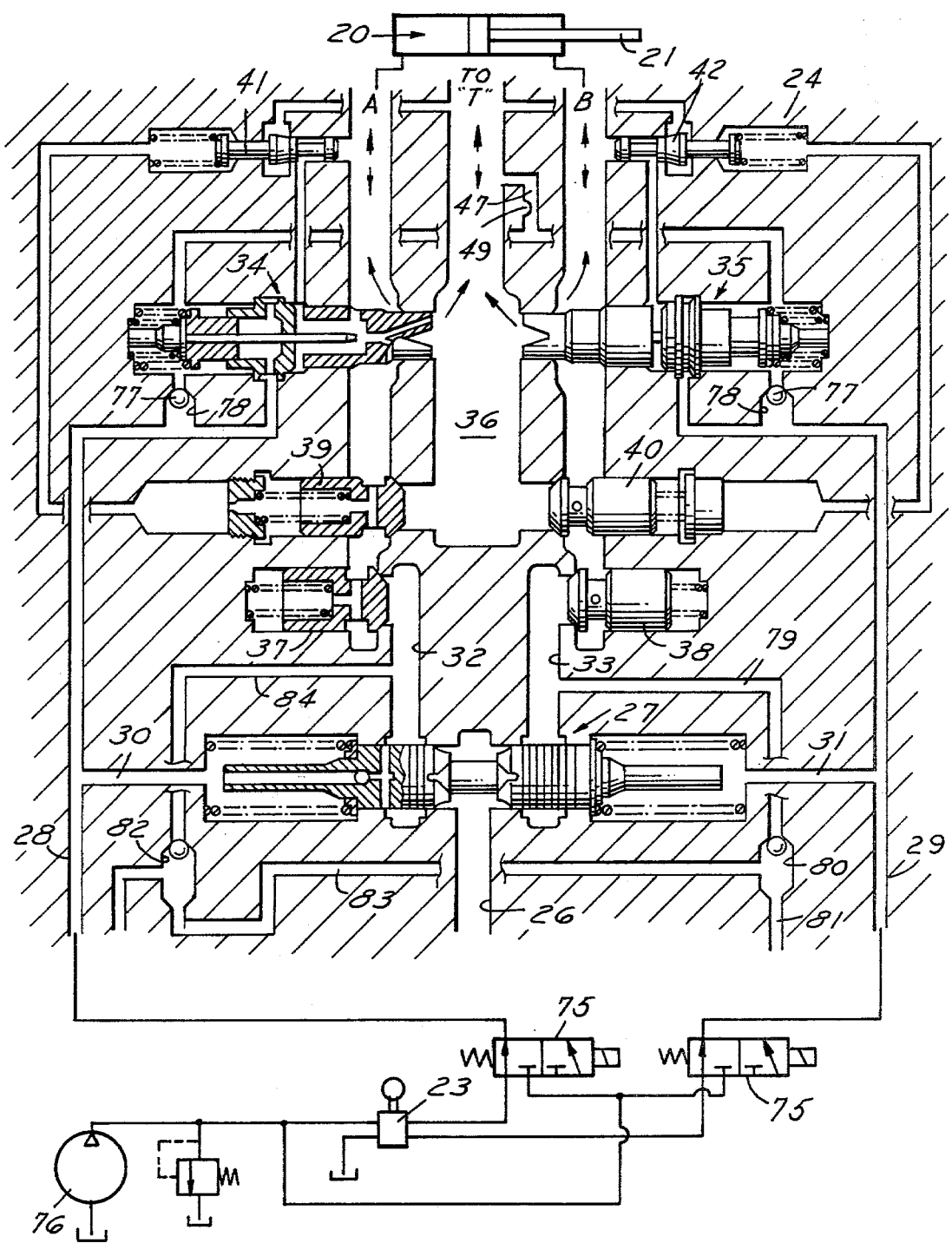

Referring to FIG. 10, to achieve a float position, the controller 23 is bypassed and pilot pressure is applied to both pilot pressure lines 28,29. This is achieved, for example, by the use of solenoid operated valves 75 which bypass controller 23 when energized and apply the fluid from pilot pump 76 directly to lines 28,29 causing both meter-out valves 34 to open and thereby permit both ends of the actuator to be connected to tank pressure. In this situation, the meter-out valves function in a manner that the stem of each is fully shifted permitting fluid to flow back and forth between opposed ends of the cylinder.

Figure 11:
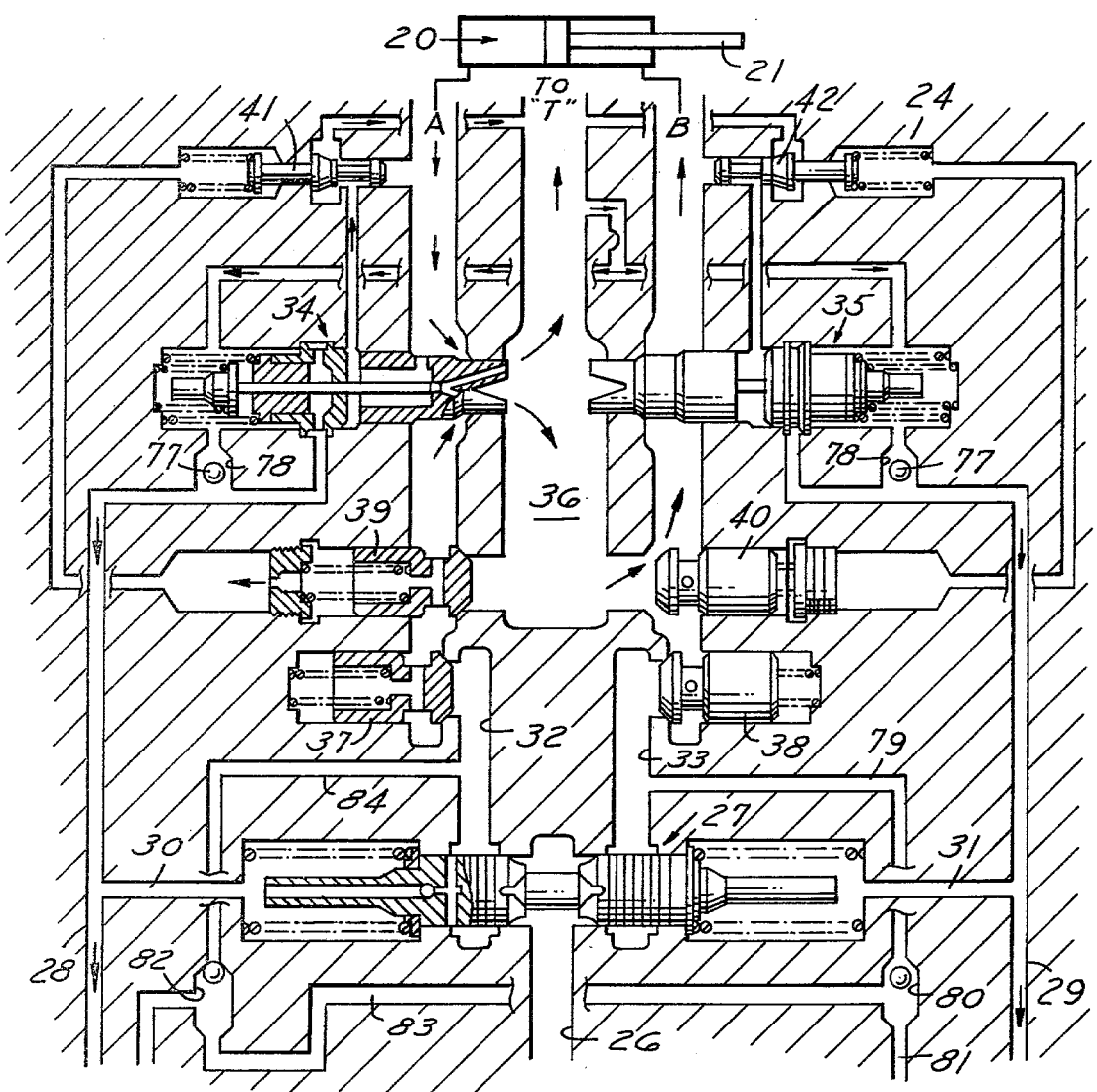
Figure 12:
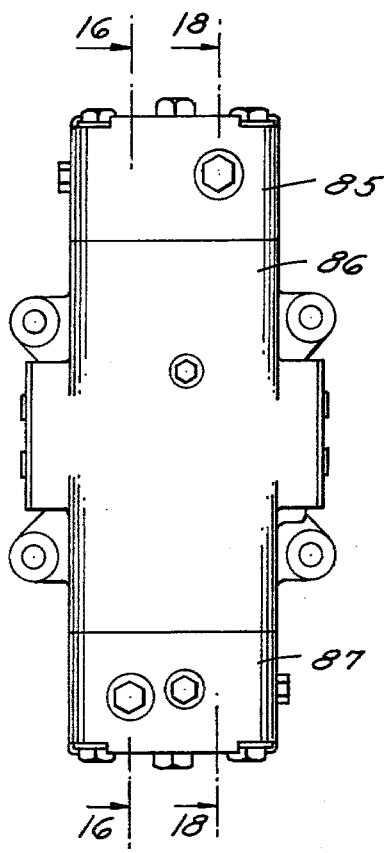
FIG. 12 is a plan view of a valve assembly embodying the invention.
Figure 13:
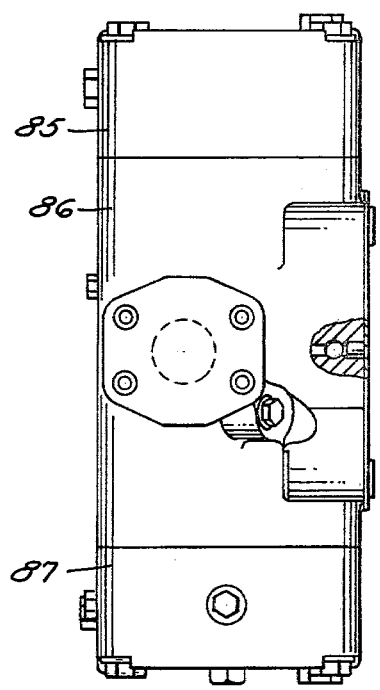
FIG. 13 is a side elevational view of the same.
Figure 14:
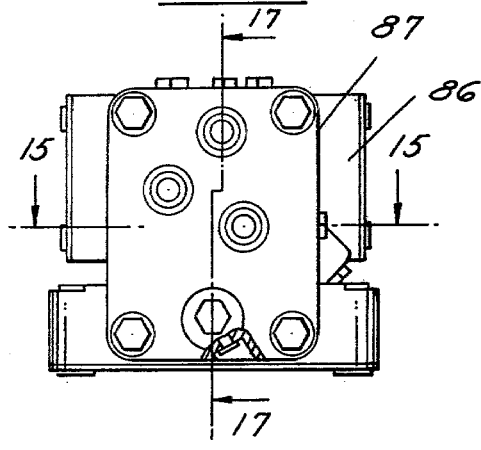
FIG. 14 is an end view of the same.
Figure 15:
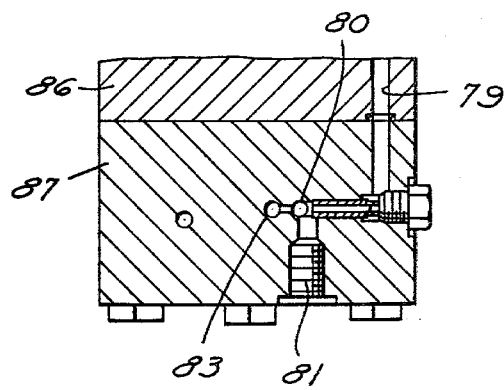
FIG. 15 is a fragmentary sectional view taken along the line 15—15 in FIG. 14.
Figure 18:
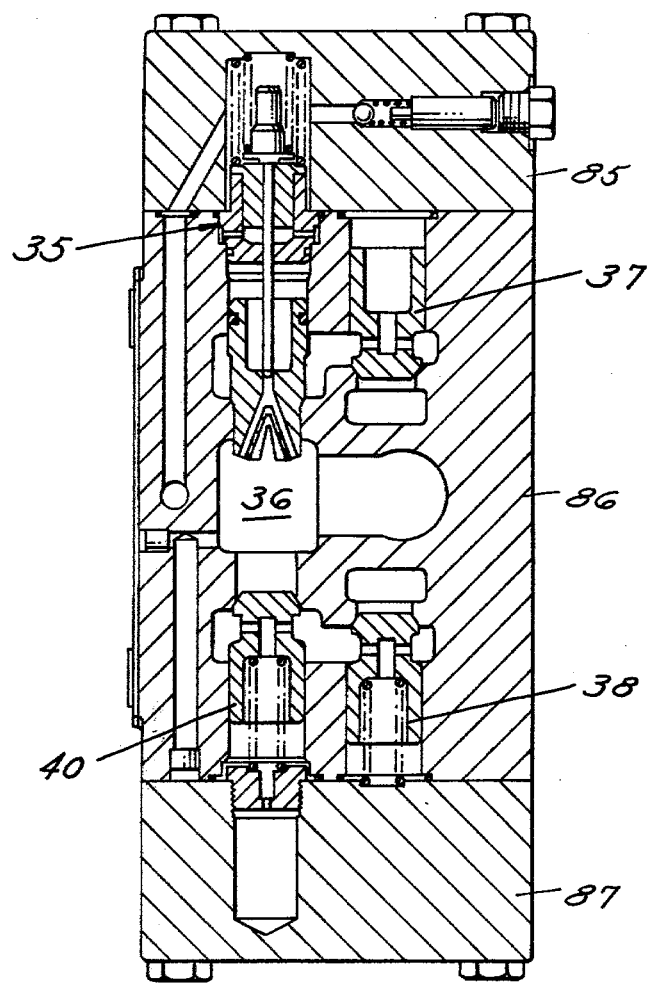
FIG. 18 is a sectional view taken along the line 18—18 in FIG. 12.

Referring to FIGS. 4 and 11, where the pressure in the return from end A of the actuator is excessive, the pilot spool 71 functions to permit the poppet valve 61 to open and thereby compensate for the increased pressure as well as permit additional flow to the actuator 20 through opening of the poppet valve 40 extending to the passage which extends to the other end of the actuator.

By varying the spring forces and the areas on the meter-in valve 27 and the meter-out valves 34,35, the timing between these valves can be controlled. Thus, for example, if the timing is adjusted so that the meter-out valve leads the meter-in valve, the meter-in valve will control flow and speed in the case where the actuator is being driven. In such an arrangement with an overhauling load, the load-generated pressure will result in the meter-out valve controlling flow and speed. In such a situation, the anti-cavitation check valves 39,40 will permit fluid to flow to the supply side of the actuator so that no pump flow is needed to fill the actuator in an overhauling load mode or condition.

Figure 5:
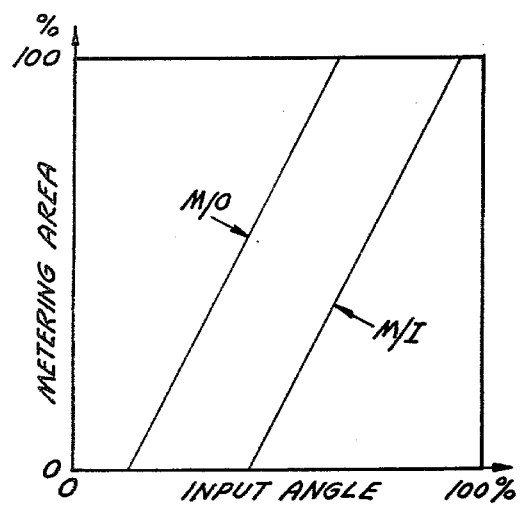
FIGS. 5-7 are graphs showing the manner in which the timing of various portions of the system may be adjusted.

The arrangement wherein the meter-out valve leads the meter-in valve is shown in FIG. 5.

Figure 6:
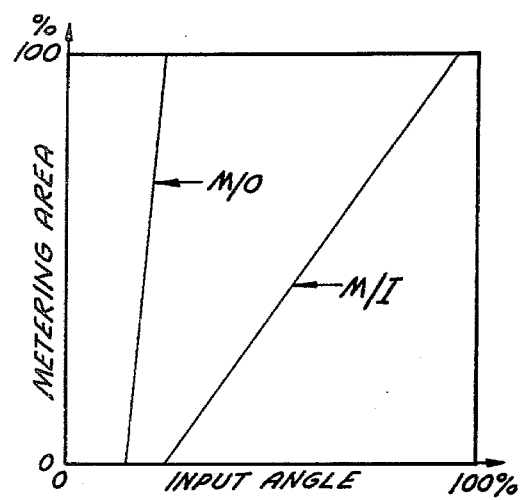
Figure 7:
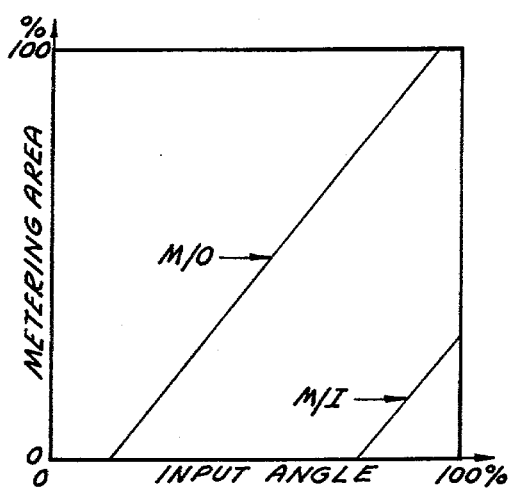

With this knowledge of independent control of the meter-out and meter-in valves, varying metering arrangements can be made to accommodate the type of loading situation encountered by the particular actuator. Thus, as shown in FIG. 6 where there are primarily energy absorbing or driving loads, the spring and areas of the meter-out valve can be controlled so that the meter-out valve opens quickly before the meter-in valve opens. In the case of primarily overrunning loads, the meter-out valve can be caused to open gradually but much sooner than the meter-in valve so that the meter-out valve is the primary control (FIG. 7).

As shown in FIGS. 1 and 8–11, a check valve 77 is provided in a branch 78 of each pilot line 28,29 adjacent each meter-out valve 34,35. The valves 77 allow fluid to bleed from the high tank pressure in passge 36, which fluid is relatively warm, and to circulate through pilot lines 28,29 back to the controller 23 and the fluid reservoir when no pilot pressure is applied to the pilot lines 28,29. When pilot pressure is applied to a pilot line, the respective check valve 77 closes isolating the pilot pressure from the tank pressure.

As further shown in FIGS. 1 and 8–11, provision is made for sensing the maximum load pressure in one of a series of valve systems 24 controlling a plurality of actuators and applying that higher pressure to the load sensitive variable displacement pump 22. Each valve system 24 includes a line 79 extending to a shuttle valve 80 that receives load pressure from an adjacent actuator through line 81. Shuttle valve 80 senses which of the two pressures is greater and shifts to apply the same to a shuttle valve 82 through line 83. A line 84 extends from passage 32 to shuttle valve 82. Shuttle valve 82 senses which of the pressures is greater and shifts to apply the higher pressure to pump 22. Thus, each valve system in succession incorporates shuttle valves 80,82 which compare the load pressure therein with the load pressure of an adjacent valve system and transmit the higher pressure to the adjacent valve system in succession and finally apply the highest load pressure to pump 22.

The provision of the load sensing system and the two load drop check valves 37,38 provide for venting of the meter-in valve in neutral so that no orifices are required in the load sensing lines which would result in a horsepower loss during operation which would permit flow from the load during build up of pressure in the sensing lines. In addition, there will be no cylinder drift if other actuators are in operation. Further, the load drop check valves 37,38 eliminate the need for close tolerances between the spool 51 and the bore 50.

In practice, the various components of valve assembly 24 are preferably made as a part of a valve which is mounted directly on actuator 20 so that the need for long flow lines from the valve assembly to the actuator is obviated. Referring to FIGS. 12-18, the valve assembly comprises three body sections 85, 86, 87. The central body section 86 has a mounting surface 88 which contains the ends of passages 32,33 providing communication to the actuator. The various components of valve assembly 24 are provided in the body sections and, for clarity, identical reference numerals are used in FIGS. 15-18. It can thus be seen that, in effect, the valve assembly of FIG. 1 is folded over to make it more compact. In addition, to facilitate opening of valves 39,40 they are repositioned in opposed relation to their respective meter-out valves 34, 35 respectively.

Although the system has been described in connection with a variable displacement pump with load sensing control, the system can also be utilized with a fixed displacement pump having a load sensing variable relief valve. In such an arrangement, the pressure from line 82 is applied to the variable relief valve associated with the fixed displacement pump rather than the variable displacement pump with load sensing control.

We claim:

1. A hydraulic control system comprising
   a hydraulic actuator having opposed openings adapted to alternately function as inlets and outlets for moving the element of the actuator in opposite directions,
   a pump for supplying fluid to said actuator,
   a meter-in valve to which the fluid from the pump is supplied,
   said valve being pilot controlled,
   a pilot controller for alternately supplying fluid at pilot pressure to said meter-in valve for controlling the direction of movement of the meter-in valve,
   a pair of lines extending from said meter-in valve to said respective openings of said actuator,
   a meter-out valve associated with each opening of the actuator for controlling the flow out of said actuator,
   each said meter-out valve being pilot operated by the pilot pressure from said controller.

2. The hydraulic system set forth in claim 1 including a load drop check valve in each said line operable to permit fluid to flow from the meter-in valve to the actuator when the pressure exceeds a predetermined value.

3. The hydraulic system set forth in claim 1 including an anti-cavitation valve in each said line to said actuator operable to pass fluid from the tank to said line when the pressure exceeds a predetermined value.

4. A hydraulic circuit as set forth in claim 1 including a modulating pilot valve associated with each said meter-out valve and operable to modulate the meter-out valve when pressure exceeds a predetermined value.

5. The hydraulic system set forth in claim 1 wherein the meter-in valve and meter-out valves are so constructed and arranged that each meter-out valve is operable to open before the meter-in valve opens in either direction.

6. The hydraulic system set forth in claim 1 wherein the meter-in valve and the meter-out valves are so constructed and arranged that each meter-out valve fully opens before the meter-in valve opens to accommodate primarily driving loads.

7. The hydraulic system set forth in claim 1 wherein the meter-in valve and the meter-out valves are so constructed and arranged that each meter-out valve begins to open before the meter-in valve opens and moves to a gradual opening to accommodate primarily overrunning loads.

8. The hydraulic system set forth in claim 1 wherein said meter-in valve and meter-out valves are mounted in close proximity to the actuator.

9. The hydraulic system set forth in claim 1 wherein said meter-in valve and said meter-out valves are mounted on said actuator.

10. The hydraulic system set forth in claim 1 wherein each said system comprises means for comparing the load pressures therein with an external pressure and determining the highest pressure.

11. The hydraulic system set forth in claim 1 including a plurality of actuators and substantially identical systems.

12. For use in hydraulic control system comprising a hydraulic actuator having opposed openings adapted to alternately function as inlets and outlets for moving the element of the actuator in opposite directions, and a variable displacement pump with load sensing control for supplying fluid to said actuator,
    a meter-in valve to which the fluid from the pump is supplied,
    said valve being pilot controlled,
    a pair of lines extending from said meter-in valve to the respective openings of an actuator,
    a meter-out valve associated with each line to the actuator for controlling the flow out of said actuator,
    each said meter-out valve being adapted to be pilot operated by the pilot pressure from a pilot controller.

13. The hydraulic system set forth in claim 12 including a load drop check valve in each said line operable to permit fluid to flow from the meter-in valve to the actuator when the pressure exceeds a predetermined value.

14. The hydraulic system set forth in claim 12 including an anti-cavitation valve in each said line to said actuator operable to pass fluid from the tank to said line when the pressure exceeds a predetermined value.

15. A hydraulic circuit as set forth in claim 12 including a modulating valve associated with each said meter-out valve and operable to modulate the meter-out valve when the pressure exceeds a predetermined value.

16. The hydraulic system set forth in claim 12 wherein the meter-in valve and meter-out valves are so constructed and arranged that each meter-out valve is operable to open before the meter-in valve opens in either direction.

17. The hydraulic system set forth in claim 12 wherein the meter-in valve and the meter-out valves are so constructed and arranged that each meter-out valve fully opens before the meter-in valve opens to accommodate primarily driving loads.

18. The hydraulic system set forth in claim 12 wherein the meter-in valve and the meter-out valves are so constructed and arranged that each meter-out valve begins to open before the meter-in valve opens and moves to a gradual opening to accommodate primarily overrunning loads.

19. The hydraulic system set forth in claim 12 wherein said meter-in valve and meter-out valves are adapted to be mounted in close proximity to the actuator.

20. The hydraulic system set forth in claim 12 wherein said meter-in valve and said meter-out valves are adapted to be mounted on said actuator.

21. The hydraulic system set forth in claim 12 wherein each said system comprises means for comparing the load pressures therein with an external pressure and determining the highest pressure.

22. A hydraulic control system comprising
a hydraulic actuator having opposed openings adapted to alternately function as inlets and outlets for moving the element of the actuator in opposite directions,
a variable displacement pump with load sensing control for supplying fluid to said actuator,
a meter-in valve to which the fluid from the pump is supplied,
said valve being pilot controlled,
a pilot controller for alternately supplying fluid at pilot pressure to said meter-in valve for controlling the direction of movement of the meter-in valve,
a pair of lines extending from said meter-in valve to said respective openings of said actuator,
a meter-out valve associated with each opening of the actuator for controlling the flow out of said actuator,
each said meter-out valve being pilot operated by the pilot pressure from said controller.

23. The hydraulic system set forth in claim 22 including a load drop check valve in each said line operable to permit fluid to flow from the meter-in valve to the actuator when the pressure exceeds a predetermined value.

24. The hydraulic system set forth in claim 22 including an anti-cavitation valve in each said line to said actuator operable to pass fluid from the tank to said line when the pressure exceeds a predetermined value.

25. A hydraulic circuit as set forth in claim 22 including a modulating pilot valve associated with each said meter-out valve and operable to modulate the meter-out valve when pressure exceeds a predetermined value.

26. A hydraulic system set forth in claim 22 wherein the meter-in valve and meter-out valves are so constructed and arranged that each meter-out valve is operable to open before the meter-in valve opens in either direction.

27. A hydraulic system set forth in claim 22 wherein the meter-in valve and the meter-out valves are so constructed and arranged that each meter-out valve fully opens before the meter-in valve opens to accommodate primarily driving loads.

28. The hydraulic system set forth in claim 22 wherein the meter-in valve and the meter-out valves are so constructed and arranged that each meter-out valve begins to open before the meter-in valve opens and moves to a gradual opening to accommodate primarily overrunning loads.

29. The hydraulic system set forth in claim 22 wherein said meter-in valve and meter-out valves are mounted in close proximity to the actuator.

30. The hydraulic system set forth in claim 22 wherein said meter-in valve and said meter-out valves are mounted on said actuator.

31. The hydraulic system set forth in claim 22 wherein each said system comprises means for comparing the load pressures therein with an external pressure and determining the highest pressure.

32. The hydraulic system set forth in claim 22 including a plurality of actuators and substantially identical systems.

33. A hydraulic control system comprising
a hydraulic actuator having opposed openings adapted to alternately function as inlets and outlets for moving the element of the actuator in opposite directions,
a pump for supplying fluid to said actuator,
a meter-in valve to which the fluid from the pump is supplied,
said valve being pilot controlled,
a pilot controller for alternately supplying fluid at pilot pressure to said meter-in valve for controlling the direction of movement of the meter-in valve,
a pair of lines extending from said meter-in valve to said respective openings of said actuator,
a meter-out valve associated with each opening of the actuator for controlling the flow out of said actuator,
each said meter-out valve being pilot operated by the pilot pressure from said controller,
said meter-in valve, meter-out valves and associated lines being mounted in a single body.

34. The hydraulic system set forth in claim 33 including a load drop check valve in said body in each said line operable to permit fluid to flow from the meter-in valve to the actuator when the pressure exceeds a predetermined value.

35. The hydraulic system set forth in claim 34 including an anti-cavitation valve in said body in each said line to said actuator operable to pass fluid from the tank to said line when the pressure exceeds a predetermined value.

36. A hydraulic circuit as set forth in claim 35 including a modulating pilot valve in said body associated with each said meter-out valve and operable to modulate the meter-out valve when pressure exceeds a predetermined value.

37. For use in a hydraulic control system comprising a hydraulic actuator having opposed openings adapted to alternately function as inlets and outlets for moving the element of the actuator in opposite directions, and a variable displacement pump with load sensing control for supplying fluid to said actuator,
a meter-in valve to which the fluid from the pump is supplied,
said valve being pilot controlled,
a pair of lines extending from said meter-in valve for connection to the respective openings of an actuator,
a meter-out valve associated with each line to the actuator for controlling the flow out of said actuator,
each said meter-out valve adapted to be pilot operated by the pilot pressure from a pilot controller, said meter-in valve, meter-out valves and associated lines being mounted in a single body.

38. The hydraulic system set forth in claim 37 including a load drop check valve in said body in each said line operable to permit fluid to flow from the meter-in valve to the actuator when the pressure exceeds a predetermined value.

39. The hydraulic system set forth in claim 38 including an anti-cavitation valve in said body in each said line to said actuator operable to pass fluid from the tank to said line when the pressure exceeds a predetermined value.

40. A hydraulic circuit as set forth in claim 39 including a modulating pilot valve in said body associated with each said meter-out valve and operable to modulate the meter-out valve when pressure exceeds a predetermined value.

* * * * *